United States Patent
Botea et al.

(10) Patent No.: US 10,282,485 B2
(45) Date of Patent: May 7, 2019

(54) NODE RELEVANCE SCORING IN LINKED DATA GRAPHS

(71) Applicant: International Business Machines Corporation, Armonk, NY (US)

(72) Inventors: Adi I. Botea, Dublin (IE); Elizabeth M. Daly, Dublin (IE); Akihiro Kishimoto, Dublin (IE); Spyros Kotoulas, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 14/520,741

(22) Filed: Oct. 22, 2014

(65) Prior Publication Data
US 2016/0117413 A1    Apr. 28, 2016

(51) Int. Cl.
*G06F 17/30* (2006.01)
(52) U.S. Cl.
CPC .. *G06F 17/30958* (2013.01); *G06F 17/30587* (2013.01)
(58) Field of Classification Search
CPC ................................ G06F 17/30958–17/30961
See application file for complete search history.

(56) References Cited

U.S. PATENT DOCUMENTS

| | | | | |
|---|---|---|---|---|
| 5,701,460 A | * | 12/1997 | Kaplan | G06F 17/30392 707/748 |
| 5,752,241 A | * | 5/1998 | Cohen | G06F 17/30469 707/713 |
| 6,021,372 A | * | 2/2000 | Harrington | G01C 21/3446 701/416 |
| 7,076,483 B2 | | 7/2006 | Preda et al. | |
| 7,512,612 B1 | * | 3/2009 | Akella | G06F 17/30958 |
| 7,644,052 B1 | * | 1/2010 | Chang | G06N 5/022 706/45 |
| 8,001,152 B1 | * | 8/2011 | Solan | G06F 17/2785 707/791 |
| 8,484,197 B2 | | 7/2013 | Tokai | |
| 8,655,989 B2 | | 2/2014 | Ritter et al. | |

(Continued)

FOREIGN PATENT DOCUMENTS

| | | |
|---|---|---|
| CN | 102722569 A | 10/2012 |
| CN | 103049431 A | 4/2013 |

(Continued)

OTHER PUBLICATIONS

Franz T. et al. "TripleRank:Ranking Semantic Web Data by Tensor Decomposition" (Eds.): ISWC 2009, LNCS 5823, pp. 213-228, 2009. Copyright Springer-Verlag Berlin, Heidelberg 2009.

(Continued)

*Primary Examiner* — Robert W Beausoliel, Jr.
*Assistant Examiner* — Nirav K Khakhar
(74) *Attorney, Agent, or Firm* — Daniel R. Simek

(57) ABSTRACT

Technique to determine relative relevance of pairs of nodes in a linked data graph, such as an RDF graph, including calculation of raw relevance scores (which are based upon adjacency relations between nodes after edge filtering, the incoming and outgoing degrees of nodes in the graph after the edge filtering, and the distance (or weight) values of the edge(s)) and/or "refined relevance scores," which take into account "complementary nodes."

17 Claims, 6 Drawing Sheets

(56) References Cited

U.S. PATENT DOCUMENTS

| | | | |
|---|---|---|---|
| 8,736,612 B1* | 5/2014 | Goldman | G06Q 50/01 345/440 |
| 2005/0198073 A1* | 9/2005 | Becks | G06F 17/30592 |
| 2006/0074858 A1* | 4/2006 | Etzold | G06F 17/30451 |
| 2006/0248093 A1 | 11/2006 | Lassila et al. | |
| 2008/0218519 A1* | 9/2008 | Coury | G06T 11/206 345/440 |
| 2008/0243811 A1* | 10/2008 | He | G06F 17/30616 |
| 2009/0024962 A1* | 1/2009 | Gotz | G06F 17/30884 715/838 |
| 2009/0240680 A1* | 9/2009 | Tankovich | G06F 17/3053 |
| 2010/0131251 A1* | 5/2010 | Suzuki | G06F 17/509 703/2 |
| 2010/0313157 A1* | 12/2010 | Carlsson | G06F 17/30604 715/769 |
| 2011/0040717 A1 | 2/2011 | Rho et al. | |
| 2011/0106526 A1* | 5/2011 | Nguyen | H03M 7/30 704/9 |
| 2012/0023085 A1 | 1/2012 | Bellerive et al. | |
| 2012/0158639 A1* | 6/2012 | Moore | G06F 17/30533 706/55 |
| 2012/0197834 A1* | 8/2012 | Panigrahy | G06N 5/048 706/52 |
| 2012/0254153 A1* | 10/2012 | Abraham | G01C 21/3446 707/716 |
| 2013/0080461 A1 | 3/2013 | Byrne et al. | |
| 2013/0132369 A1* | 5/2013 | Delling | G01C 21/3446 707/716 |
| 2014/0214945 A1* | 7/2014 | Zhang | H04L 67/306 709/204 |
| 2014/0337306 A1* | 11/2014 | Gramatica | G06F 17/30731 707/706 |
| 2016/0078148 A1* | 3/2016 | Werneck | G06Q 30/02 707/798 |
| 2016/0203130 A1* | 7/2016 | Roque | G06F 17/30684 707/741 |

FOREIGN PATENT DOCUMENTS

| | | |
|---|---|---|
| WO | 2004088475 A2 | 10/2004 |
| WO | 2013127951 A1 | 9/2013 |

OTHER PUBLICATIONS

Gao, B. et al. "Semi-Supervised Ranking on Very Large Graphs with Rich Metadata". KDD'11, Aug. 21-24, 2011, pp. 96-104. San Diego, USA. Copyright 2011 ACM.

Gueffaz, M. et al. "Temporal Logic to Query Semantic Graphs Using the Model Checking Method". Journal of Software, vol. 7. No. 7, Jul. 2012. pp. 1462-1472. Copyright 2012 Academy Publisher.

Halaschek, C. et al. "Discovering and Ranking Semantic Associations over a Large RDF Metabase". pp. 1317-1320. Proceedings of the 30th VLDB Conference, Toronto 2004.

Lofgren, P. et al. "Personalized PageRank to a Target Node". arXiv:1304.4658v2 [cs.DS] Apr. 11, 2014.

Montanelli, S. et al. "Semantically routing queries in peer-based systems: the H-Link approach". The Knowledge Engineering Review, vol. 23:1, pp. 51-72. Copyright 2008, Cambridge University Press.

"Centrality-Wikipedia, the free encyclopedia". Sep. 16, 2013. [online]<http://en.wikipedia.org/w/index.php?title=Centrality&oldid=573217225>.

"Eigenvalues and eigenvectors—Wikipedia, the free encyclopedia." Sep. 18, 2013. [online]. <http://en.wikipedia.org/w/index.php?title=Eigenvalues_and_eigenvectors&oldid=573428962>.

"Google PageRank-Algorithm." [online][retrieved on: Apr. 24, 2014]<http://pr.efactory.de/e-pagerank-algorithm.shtml>.

"HITS algorithm-Wikipedia, the free encyclopedia". Apr. 21, 2013. [online]. <http://en.wikipedia.org/w/index.org/w/index.php?title=HITS_algorithm&oldid=573428962>.

"Random Surfer" [online][Retrieved on Apr. 24, 2014] 1.6 Case Study: Random Surfer. <http://introcs.cs.princeton.edu/lectures/16pagerank-2x2.pdf>.

\* cited by examiner

NODE RELEVANCE SCORING IN LINKED DATA GRAPHS

BACKGROUND OF THE INVENTION

The present invention relates generally to the field of linked data graphs, and more particularly to node differentiation in very large linked data graphs.

Linked data graphs cover a very broad domain, comprising knowledge from various fields, such as life sciences, geography and other areas of general interest. Linked Data Graphs have explicit, global semantics, such as the RDF. In other words, nodes and edges have a globally-valid meaning. This allows machine logic to integrate information across disparate systems. The richness of information available through integration comes at a price: the resulting graphs can be very large, creating a challenge when it comes to efficiently analyzing such structures. Currently, linked data contain over 40 billion edges, and the growing rate is considerable.

Risk analytics are techniques to identify and assess factors that influence achieving a goal. Machine logic implementing risk analytics is typically created based on expert knowledge.

Dijkstra's algorithm is a graph search algorithm that solves the single-source shortest path problem for a graph with non-negative edge path costs, producing a shortest path tree. Dijkstra's algorithm is often used in routing and as a subroutine in other graph algorithms. For a given source vertex (node) in the graph, the algorithm finds the path with lowest cost (that is, the shortest path) between that vertex and every other vertex. It can also be used for finding costs of shortest paths from a single vertex to a single destination vertex. This is done by stopping the algorithm once the shortest path to the destination vertex has been determined. For example, assume the vertices of the graph represent towns and edge path costs represent travel distances between pairs of towns connected by a direct road, Dijkstra's algorithm can be used to find the shortest route between one town and all other town. As a result, the shortest path algorithm is widely used in network routing protocols (for example, IS-IS and OSPF (Open Shortest Path First)).

SUMMARY

According to an aspect of the present invention, there is a method, computer program product and/or system for determining one or more relevance score(s) for node(s) in a linked data graph which includes a plurality of nodes and a plurality of edges, with each edge having a respectively associated weight value that performs the following steps (not necessarily in the following order): (i) receiving an identity of a start node from among the nodes of the linked data graph and an identity of a set of target node(s), including at least a first target node, from among the nodes of the linked data graph; (ii) filtering zero or more edges from the plurality of edges; (iii) calculating a first raw relevance score, the first raw relevance score corresponding to the relevance of the first target node to the start node, where the first raw relevance score calculation is based, at least in part, on the following: (a) adjacency relations between nodes after edge filtering, (b) the incoming and outgoing degrees of nodes in the graph after the edge filtering, and (c) the weight values of the edges.

DETAILED DESCRIPTION

Figure 1:
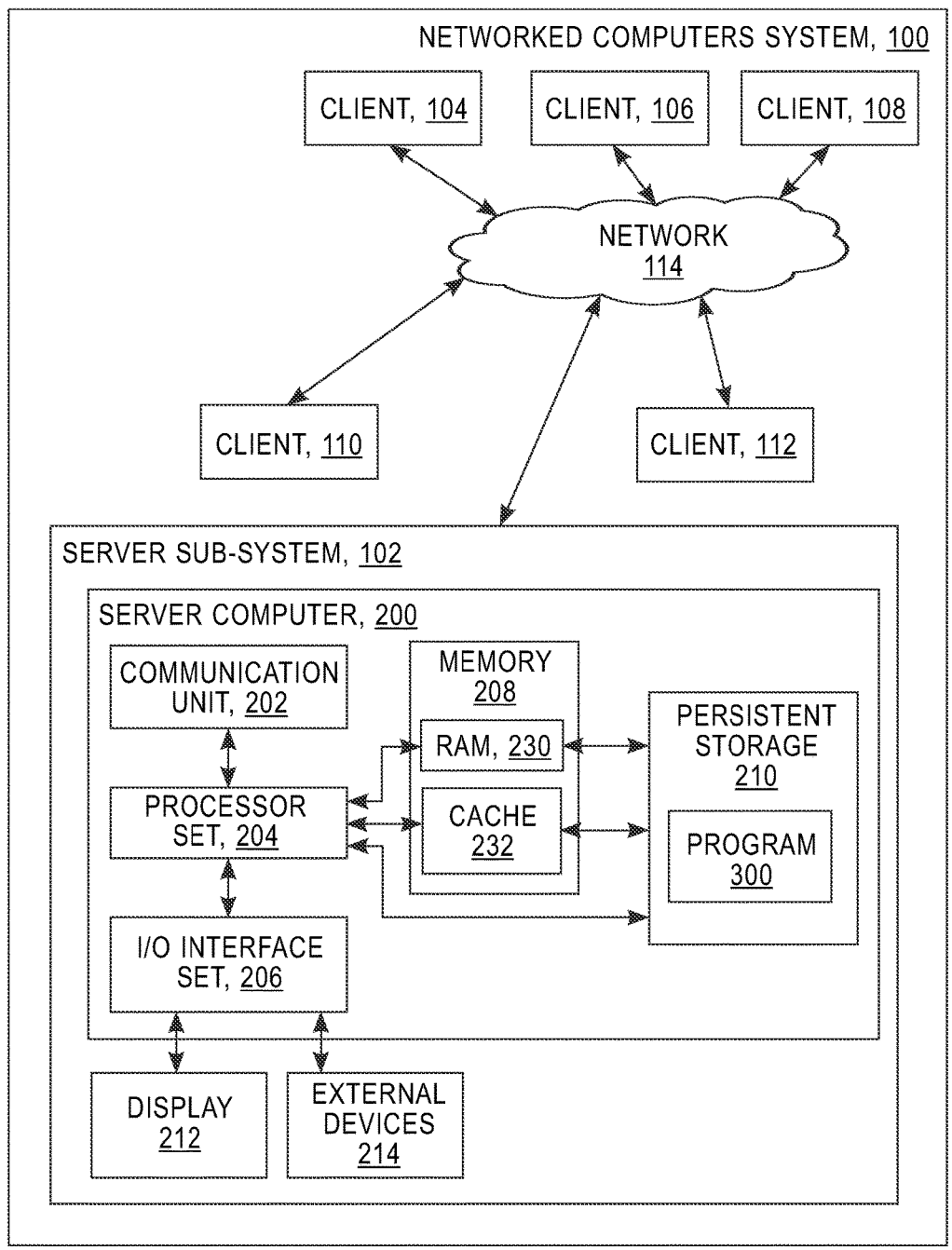
FIG. 1 is a block diagram view of a first embodiment of a system according to the present invention.

Some embodiments of the present invention provide a way to determine relative relevance of pairs of nodes in a linked data graph, such as an RDF graph. Some embodiments of the present invention calculate raw relevance scores (which are based upon adjacency relations between nodes after edge filtering, the incoming and outgoing degrees of nodes in the graph after the edge filtering, and the distance (or weight) values of the edge(s)). Some embodiments of the present invention further calculate "refined relevance scores," which take into account "complementary nodes." This Detailed Description section is divided into the following sub-sections: (I) The Hardware and Software Environment; (II) Example Embodiment; (III) Further Comments and/or Embodiments; and (IV) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.) system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that now, and/or in the near future: (i) external device(s) 214 may be able to supply, some or all, memory for server sub-system 102; and/or (ii) devices external to server sub-system 102 may be able to provide memory for server sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to server sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
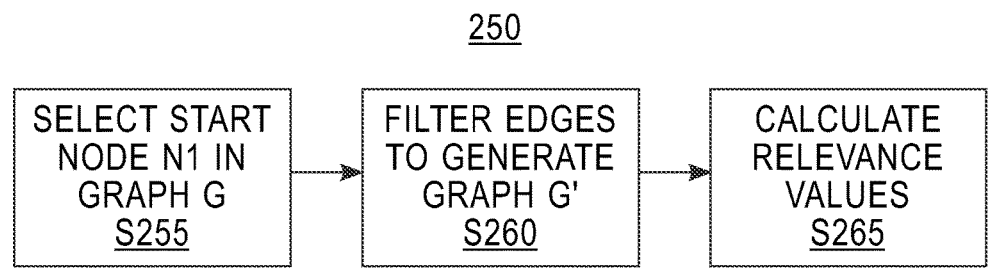
FIG. 2 is a flowchart showing a first embodiment method performed, at least in part, by the first embodiment system.
Figure 3:
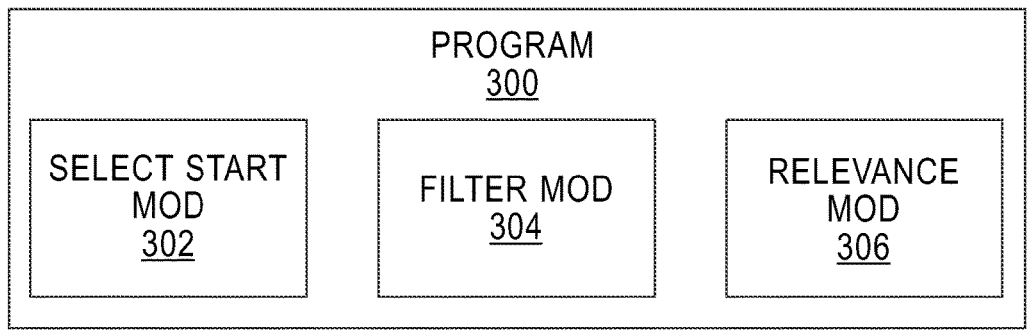
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Figure 4A:
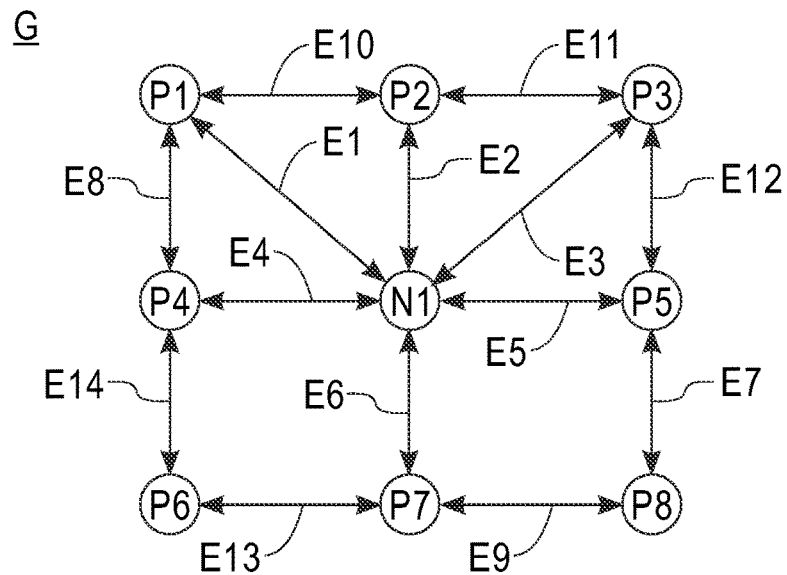
FIGS. 4A and 4B are linked data graphs according to the present invention.

Processing begins at step S255, where select start module ("mod") 302 receives the data corresponding to linked data graph G (see FIG. 4A), and selects a "start node," which, in this example is node N1 (see FIG. 4A). All of the other nodes of graph G (in this example, nodes P1, P2, P3, P4, P5, P6, P7 and P8 and sometimes referred to as "relevance nodes" or "target nodes") will be evaluated for relevance to the start node by this method of flow chart 250. As shown in FIG. 4A, in graph G, the various nodes are linked by edges E1, E2, E3, E4, E5, E6, E7, E8, E9, E10, E11, E12, E13 and E14.

Figure 4B:
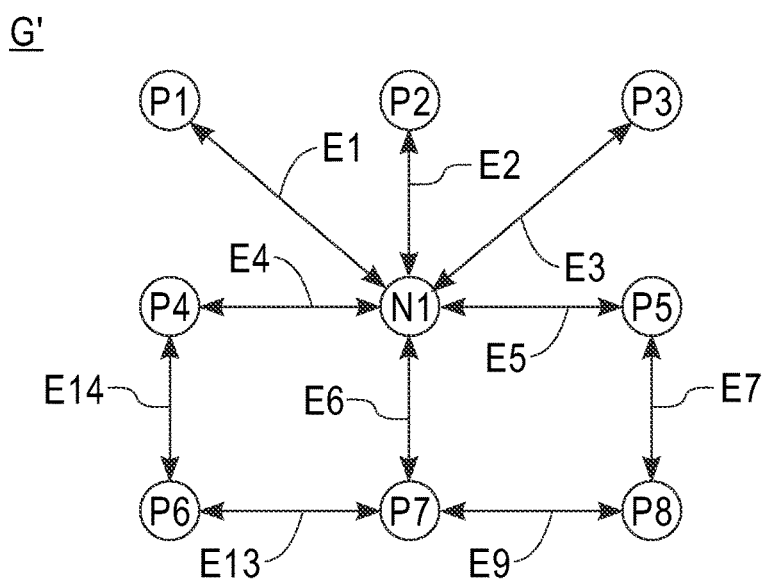

Processing proceeds to step S260, where filter mod 304 filters out (that is, removes from consideration) certain edges. In this example, the filtered edges are the edges that are not included in the shortest path from N1 to any of the relevance nodes. The identity of the filtered out edges can be most easily seen by comparing graph G of FIG. 4A to Graph G' FIG. 4B (where the filtered edges have been removed). In some embodiments, and as explained in detail below, Dijkstra's Algorithm may be used in filtering. In other embodiments, other filtering criteria may (additionally or alternatively) be used. For example, some embodiments may filter out edges having a very, very long "length." This filtering step can become especially helpful when dealing with very large linked data graphs because it reduces the amount of processing required in the next step.

Processing proceeds to step S265, where relevance mod 306 calculates relevance values (with respect to N1) for each relevance node P1 to P8. These relevance values may sometimes be herein referred to as "raw relevance scores," in order to distinguish this type of score from a "refined relevance scores," which have been subject to refinement based on accounting for complementary nodes (as will be discussed in detail in the following sub-section of this Detailed description section). Some of the information needed to calculate relevance values is the identity of the nodes, edge and interconnectedness of graph G' (see FIG. 4B). Other information needed is the "distance," and corresponding "weight" of each edge present in graph G'. In this example, "weight" is simply the inverse (or reciprocal) of the distance value of an edge. In this simple example, each edge has the following distance: (i) DE1=DE2=DE3=DE4=DE7=DE9=DE13=DE14=1.0; and (ii) E5=0.5. In this simple example, each edge has the following weight: (i) WE1=WE2=WE3=WE4=WE7=WE9=WE13=WE14=1.0; and (ii) WE5=2.0.

Using this information, relevance values for a relevance node P are calculated as follows:

ITEM 1.
Run the Dijkstra algorithm starting from node N1.

ITEM 2.
Eliminate edges that do not belong to any shortest path from N1 to some other node. Add a direction to every other edge, in the direction of shortest paths from N1 to other nodes.

ITEM 3.
Iteratively propagate a flow through the graph, starting from N1, using the preserved edges and the direction assigned to them. The flow in N1 is initialized to a value of f(N1)=1. The flow is then discounted by multiplying it with a discount rate r, obtaining a discounted flow df(N1)=r*f(N1). If r=0.95, then df(N1)=0.95*1=0.95. The discounted flow is spread on the outgoing edges from N1, proportionally with the weights of the edges. According to this, f(E5)=0.270, f(E1)=f(E2)=f(E3)=f(E4)=f(E6)=0.135. Recursively, the flow of a node f(P) is the sum of the flows along its incoming edges. Hence, f(P1)=f(P2)=f(P3)=f(P4)=f(P7)=0.135, and f(P5)=0.270. Propagating these further, we obtain that f(E7)=r*f(P5)=0.95*0.270=0.256. f(E9)=f(E13)=df(P7)/2=(0.95*0.135)/2=0.0641. f(E14)=df(P4)=0.128. Finally, f(P8)=f(E7)+f(E9)=0.256+0.0641=0.3201, and f(P6)=f(E13)+f(E14)=0.0641+0.128=0.192. By definition, the relevance score of P to the starting node N1 is S(P,N1)=f(P).

ITEM 4.
Nodes can be ordered decreasingly according to their relevance score. Top nodes in this ranking are considered to be the most relevant to the starting node N1. In this example, the ordering (or ranking) is as follows: (i) f(P8)=0.3201; (ii) f(P6)=0.192; and (iii) f(P1)=f(P2)=f(P3)=f(P4)=f(P7)=0.135.

III. Further Comments and/or Embodiments

The relevance can be computed independently for two different starting nodes. Then, the relevance results can be contrasted to each other for a more accurate relevance score. As mentioned above, this will sometimes be herein referred to as a "refined relevance score." For instance, the two starting nodes N1 and N2 can correspond to two concepts that are complementary to each other, such as earning more than $50,000 per year, or earning less than $50,000 per year. Given a node P, using S(P,N1)−S(P,N2) as a refined relevance score of P to N1 (where S(P, N1) and S(P, N2) are "raw relevance scores") can be beneficial, as will be discussed in detail, below. It is noted that: (i) "complementary nodes" refer to any set of two or nodes that are mutually exclusive; and (ii) in cases where there are more than two complementary nodes, a refined relevance score should subtract the relevance scores from target node P to each respective node that is complementary to the target node of interest; and (iii) for example, if N1 were one of a set of four complementary nodes then the refined relevance score for N1 to P would be based upon the raw relevance scores as follows: R(P,N1)=S(P,N1)−S(P,N2)−S(P,N3)−S(P,N4).

Some embodiments of the present invention may have a business value to: (i) companies using technologies to increase the information space addressed by their analytics so as to get a competitive advantage (for example, web sources valuable to the operations of an enterprise); (ii) data vendors; (iii) cross-agency and cross-department analytics (ability to get insight across domains); (iv) care coordination system designers; (v) designers seeking to combine information from multiple agencies and web sources (for example, location of various amenities); and/or (vi) designers seeking to increase the information consumable and/or digestible by analytics.

A "use case" will now be discussed. A hypothetical care management system exists which identifies people at risk of homelessness based on currently known factors such as education, history, social factors such as substance abuse based on a pre-existing model. Two new data sources are integrated in the system (using RDF): (i) correctional system (for example, criminal conviction data); and (ii) employment history data. In addition, an ontology classifying different types of substance abuse is available (external Web data). An embodiment of the present invention "mines" the relevant factors, using machine logic rather than human intervention, based on observed data.

Figure 5:
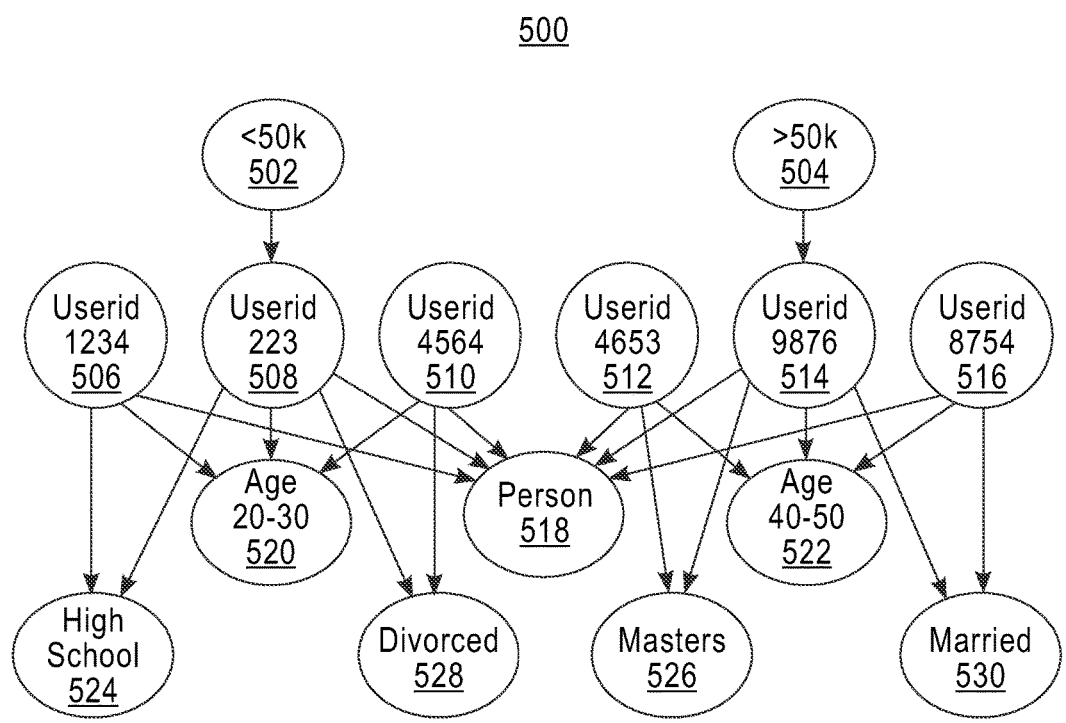
FIG. 5 is a linked data graph according to the present invention.

As shown in FIG. 5, linked data graph (also called "RDF graph") includes nodes 502, 504, 506, 508, 510, 512, 514, 516, 518, 520, 522, 524, 526, 528, 530; and links (also called "edges," no separate reference numerals in FIG. 5, shown as arrows in FIG. 5). Linked data graph 500 is used in a problem solved by an embodiment of the present invention (in this case, example with realistic data). An algorithm according to an embodiment of the present invention identifies relevant factors related to an attribute, or a few related attributes, by traversing RDF graph 500 to determine which nodes are potentially relevant to determining whether it is likely that an individual earns more than X dollars per year in salary.

More specifically RDF graph 500 is used in the following method: (i) start graph 500 traversal with the two complementary starting factors (in this case <50 k and >50 k and rank nodes connected to each factor); (ii) generate two ranked lists. The divergent rankings in each list gives final ranking. For example, person relevant rankings in this example are as follows: (i) ">50 k starting node" leads to a relevance ranking of 0.0700134; (ii) "<50 k" starting leads to a relevance ranking of 0.0669838; and (iii) relevance ranking for predicting ">50 k" is (0.0700134−0.0669838), or 0.0030296.

An embodiment for a method for computing relevance to a single node will be discussed in detail below with reference to FIG. 6. However, at this point, an overview of each step of a method embodiment will be mentioned: (i) assigning weights to edges is done uniformly (unit costs), or inversely proportional with branching factor and with number of siblings of the same type; (ii) filtering edges can be done by running Dijkstra's algorithm from N to filter away edges not on shortest paths from N to a node; (iii) assigning ranks to nodes can be performed through flow analysis from N to calculate amount v passing through each node; and (iv) ordering nodes is performed decreasingly on v and disregards nodes with small v. Further with respect to item (iii) in the preceding list: (a) order nodes increasingly on shortest-path cost from N (e.g., the order nodes got expanded in Dijkstra during the edge filtering step (ii)); (b) for each node, compute an incoming flow; and (c) two intuitions inherent in some embodiments are that given a node P, its flow value v measures the relevance of P to N, and v tends to be larger if there are many paths from N to P, and if these paths are shorter.

Some embodiments of the present invention may include one, or more, of the following features, characteristics and/or advantages: (i) scales well with large graph size; (ii) memory complexity linear in (N+E). N=number of nodes, E=number of edges; and (iii) computational complexity O(N log N+E).

Some embodiments of the present invention may include one, or more, of the following features, characteristics and/or advantages: (i) works on RDF graphs; (ii) agnostic to semantic knowledge; (iii) relying solely on the structure of the input graph (no knowledge on, for example, contents of nodes required); and/or (iv) focused on relevance to one node/pair of nodes.

Some embodiments of the present invention may include one, or more, of the following features, characteristics and/or advantages: (i) ranking of node importance/relevance in relation to a given starting node; (ii) no supervision required; (iii) no rich contents of nodes, edges required (just a label will do); (iv) relevance computed to one or two nodes in the graph; (v) finds important nodes in the graph, starting from one or a small set of nodes; (vi) finding the most relevant nodes for browsing; (vii) scale beyond one or maximum two hops (that is, depth levels); (viii) uses a combination of search and ranking to scale to very large graphs; and/or (ix) uses search to get the relevant nodes for ranking.

A method and system to identify relevant nodes from very large RDF graphs will now be discussed. The need to analyze large graphs with heterogeneous data is increasingly important. Existing methods have serious limitations, being challenged by the size of the data and its graph structure. A method and system to analyze very large RDF graphs will be presented in the following discussion. Some embodiments of the present invention help identify a small subset of nodes that are relevant to a node or a few nodes given as input.

Some embodiments of the present invention incorporate search-based approaches to efficiently identify a small subset of nodes relevant to one node or a few nodes that are given as input and scales well with large-scale graphs represented as RDF. This problem poses serious challenges to existing art. For example, risk analytics are techniques to identify and assess factors that influence achieving a goal. In many domains, risk analytics can be employed based on expert knowledge. However, this requires a significant manual intervention, which is very difficult in the case of very large sets of linked data graphs. Manual analysis can be very tedious, and it can easily lead to inaccurate results, due to human errors and to the likelihood of missing relevant, hidden connections in the data. Available methods based on statistical measures, such as regression analysis, are not suited for graphs, and do not scale well to the large graphs.

A "use case" and example will now be discussed. Consider an existing care management system which identifies people at risk of homelessness based on currently known factors such as education history and substance abuse. Two new data sources are integrated in the system, using RDF: prison-system data, with details on past convictions, and tax-revenue data, showing employment history. In addition, an ontology classifying different types of substance abuse is available as external Web data. An algorithm according to an embodiment of the present invention identifies relevant factors related to an attribute, or a few related attributes, by traversing the RDF graph given as input. For example, assume that one is interested in finding out which nodes are potentially influencing whether a person earns over or under 50 k. The RDF graph contains two nodes, N1 and N2, labeled as "<50K" and ">50K" respectively. The first node encodes the fact of earning less than 50K per year. All individuals encoded in the graph, known to satisfy this condition, will be linked to the "<50K" node. The other node, labeled as ">50K" is similar, the difference being that it encodes the fact of earning more than 50K per year.

The algorithm starts by performing two independent searches. Each search starts from one of the two complementary nodes N1 and N2. The result of each search is a scoring of the nodes in graph, where the score of each graph node estimates the relevance of a given node to the starting node (N1 or N2) (see technical details, below). The two distinct sets of scores are compared to each other to identify what nodes are more relevant to N1, what nodes are more relevant to N2, and what nodes have comparable relevance to both N1 and N2. The latter case corresponds to cases where a given node in the graph has a negligible influence on whether someone ends up earning over 50K or under 50K per year. For example, the RDF node labeled "Person" is assigned a relevance score of 0.0700134 to the ">50K" node (N2), and a score of 0.0669838 to the "<50K" node (N1). Each of these scores indicate a relatively high relevance. Such a result is not surprising on its own: since people earn money, it makes sense, intuitively, that nodes "People" and "<50K", for instance, are related to some extent.

However, the algorithm under discussion makes a finer distinction, indicating factors that are more relevant to one original node (e.g., "<50K") and less relevant to the other (">50K"). Thus, machine logic computes the difference between the scores, obtaining 0.0030296, a 20-fold reduction. The intuition is that, because "Person" has approximately the same relevance to both N1 and N2, it does not contribute much to the distinction between the two nodes (see more technical details, below).

One method, according to the present invention, finds relevant information from a large RDF graph by performing the following operations (not necessarily in the following order): (i) reading an input RDF graph G; (ii) reading a set M of one, two, or a few nodes from G; (iii) computing, for each node N in M, and each node P in G, a score S(P,N) reflecting the relevance of P to N; (iv) contrasting scores S(P,N) for several nodes N in M, for a more accurate scoring; (v) for each node N in M, ranking nodes P according to score S(P,N).

Figure 6:
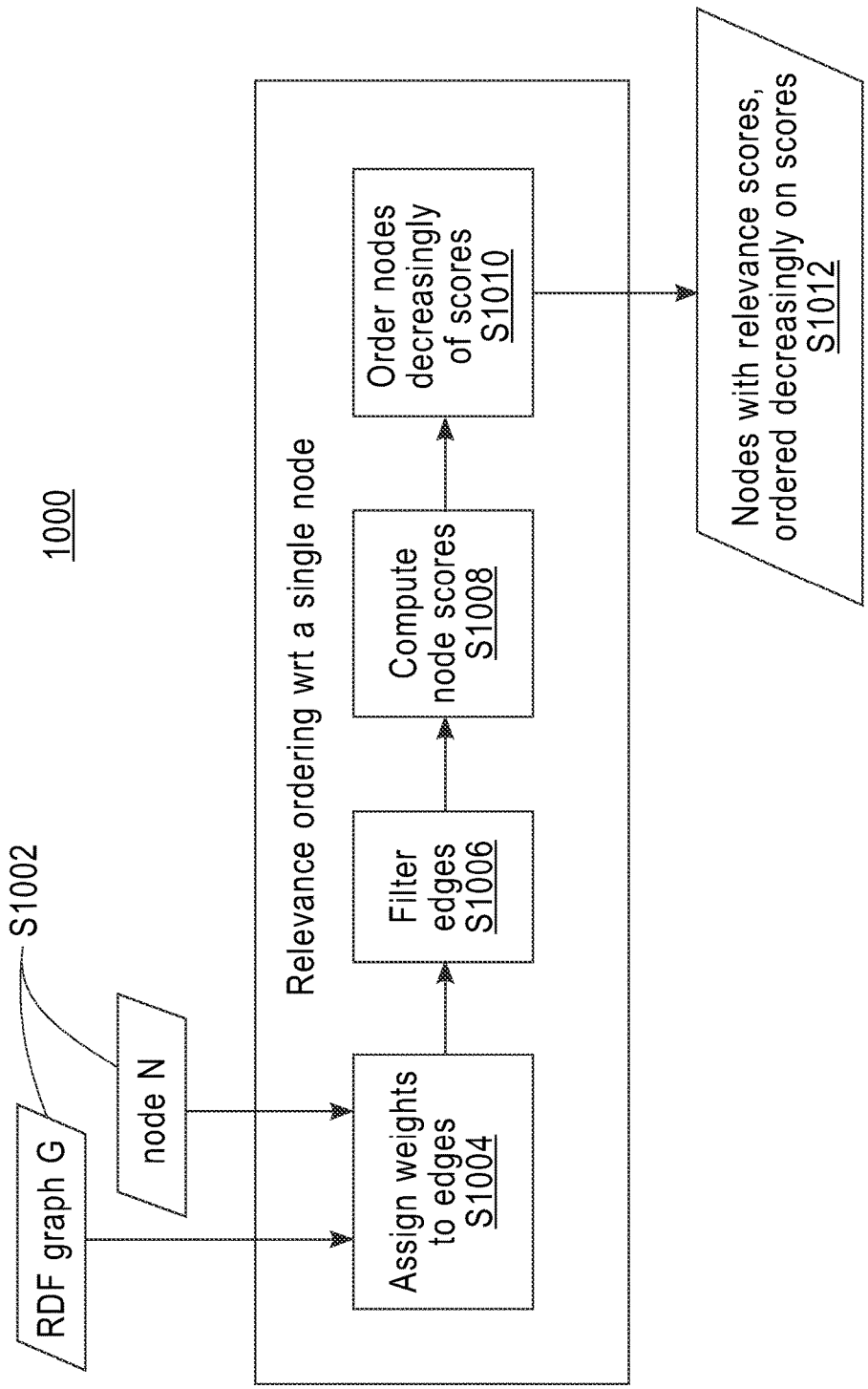
FIG. 6 is a flow chart showing a second embodiment of a method according to the present invention.
Figure 7:
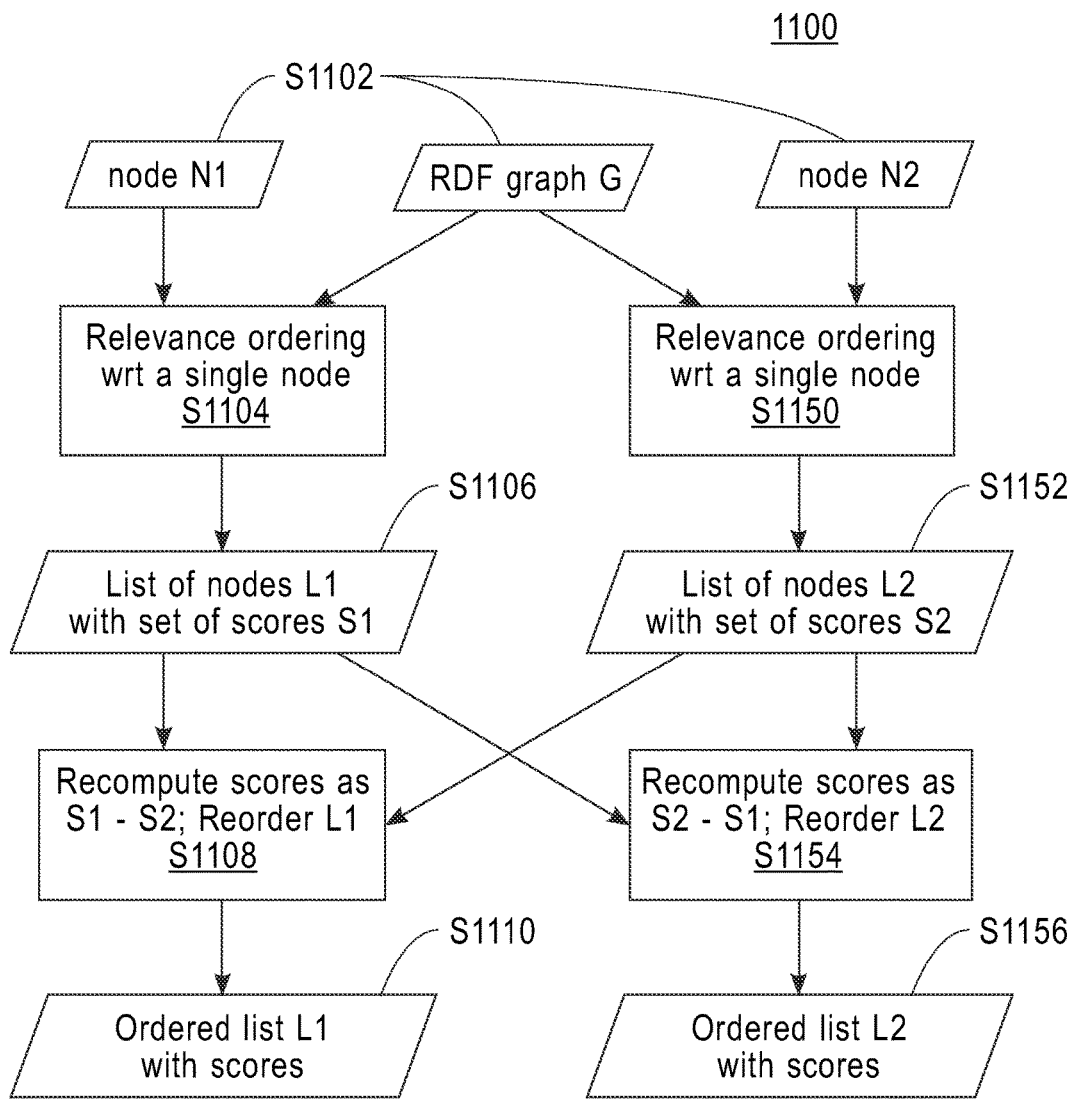
FIG. 7 is a flow chart showing a third embodiment of a method according to the present invention.

As shown in FIGS. 6 and 7: (i) flow chart 1000 shows a first stage of a method according to an embodiment of the present invention; and flow chart 1100 shows the second stage of the method. The first stage 1000 takes an RDF graph G, and a single node N in the graph, and compute scores (ranks) to all graph nodes. The second stage 1100 combines the results obtained for different individual starting nodes.

The first stage 1000 will now be discussed. Computed node scores operation S1008 estimates the relevance of a given node to the starting node N. The method of flowchart 1000 starts with the assigning weights to edges operation S1004. An assignment as simple as unit weights (that is, all edges having a weight of 1) will do. For simplicity, assume that the method works with unit weights for edges. Then, machine logic run the Dijkstra algorithm on G, starting from N. The output of the Dijkstra algorithm allows to identify shortest paths from N to any node in the graph. Operation S1006 filters away (that is, ignore them in the following steps) all edges that do not belong to a shortest path from N to at least one node. Furthermore, nodes have a depth that corresponds to the length of a shortest path from N.

In summary, the result of running the Dijkstra algorithm is that some edges of G have been removed, and the remaining edges are directed (from smaller depths to larger depths). This is the structure of the graph considered in the rest of the process.

The next operation S1008 computes scores for nodes. This is performed with a flow analysis method that simulates a flow through the graph, starting from N and passing through all edges (not filtered away at previous operation S1006). This flow simulation mechanism respects the following two principles: (i) the closer a node to N, the higher the relevance; and (ii) the more optimal paths to a node, the higher the relevance. The flow is defined recursively as will now be discussed. The flow in the initial node N is 1. For all other nodes P, the flow is the sum of all flows through incoming edges to P. A node P generates a flow to its outgoing edges. First, P's flow is multiplied by a discount rate r<1. Then, the remaining flow is split among the outgoing edges. In variation on the embodiment under discussion, the splitting is even among all outgoing edges. In another embodiment, the flow is first split among the outgoing edges proportionally with their weights. The type of an edge is given by its label in the RDF graph. For each edge type, the resulting sub-flow is split further evenly among all outgoing edges of that type. The operation of block S1010 completes the recursive definition of the flow. As shown at S1012 block of first stage 1000, the score (rank) of a node is precisely the flow value in that node.

Second stage 1100 will now be discussed with reference to FIG. 7. The operations of second stage 1100 include the following operations (with process flow among and between the operations as shown by the arrows in FIG. 7): S1102; S1104; S1106; S1108; S1110; S1150; S1152; S1154; and S1156. Second stage 1100 considers two (2) complementary starting nodes, such as ">50K" and "<50K", and applies the processing outlined above (stage one) to each starting node independently. The two resulting sets of scores are compared against each other to emphasize the relevance of a given node to each of the two starting nodes. In the figure, S1–S2 refers to the pair-wise difference between the two resulting sets of scores. In other words, given a node P, (S1–S2)(P) is defined as S1(P)–S2(P).

A data set from the UCI Machine Learning Repository (see http://archive.ics.uci.edu/ml/datasets/Adult) was used to make a preliminary evaluation of the performance the above-described method. In this data set, there are 48,842 records of adults with 14 attributes including age, marital status, capital gain and loss, education, gender, native country and hours per week. Other attributes were added, such as first name, last name, and social relationships between people and then converted these data into a RDF graph. Additionally, data was purposely re-structured to introduce the complexity of a graph model. For example, the graph does not have an education level property per person but has an additional node that refers to the educational attainment.

As input, processing started with two nodes that represent the annual income of more than 50K euro and less than 50K euro, respectively and extracted a set of nodes that capture the characteristics of the person earning >50K (or <50K) euro per year. In summary, from the RDF graph constructed in the above way, we found the fact that the person with >50K euro income tends to have the following properties: male, married, age of 40s, with college education, working 50 hours per week and non-zero values for capital gain and loss. In contrast, the person with the following characteristics is likely to earn less than 50K: female, separated, divorced or widowed, age of 20s, high school graduate (rather than college), and zero values for capital gain or loss.

Some embodiments of the present invention may include one, or more, of the following features, characteristics and/or advantages: (i) identifying, in a graph, a (small) subset of nodes that are relevant to a given starting node; (ii) for two or more such starting nodes, their subsets of relevant nodes can be contrasted against each other to increase the accuracy of the results; (iii) applicability extends beyond RDF graphs representing information architectures; (iv) no query is required in the input (other than indicating one or several starting nodes; (v) the output is a ranked subset of nodes relevant to a given starting node, which is different from a path in the graph; (v) identifies a subset of nodes relevant to a given concept; (vi) analyzes the nodes connected along paths starting at a root node; (vii) given two or more related starting nodes, their subsets of relevant nodes can be contrasted against each other in order to determine nodes relevant to the given concept; (viii) obtains ranked nodes related to a set of nodes by directly traversing the initial graph without transforming it to the resource graph; (ix) the initial graph can be arbitrary as long as it is represented as an RDF graph; (x) searches the graph and scores edges to identify the most relevant nodes; and/or (xi) contrasts the scores for these edges to identify what are the distinguishing factors between the plurality of input nodes.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for configuring data of a data storage system through filtering edges of a linked data graph which includes a plurality of nodes and a plurality of edges, the method comprising:

receiving, by one or more processors, an identity of a start node from among the nodes of the linked data graph and an identity of a set of target node(s), including at least a first target node, from among the nodes of the linked data graph;

configuring, by one or more processors, data of the data storage system through filtering at least one edge from the plurality of edges of the linked data graph, wherein the edge filtering includes filtering, by removing, an edge that is not on a shortest path between the start node and a target node of the linked data graph;

generating, by one or more processors, a filtered linked data graph corresponding to the filtering of the at least one edge from the plurality of edges of the linked data graph;

calculating, by one or more processors, a first raw relevance score, the first raw relevance score corresponding to the relevance of the first target node to the start node, where the first raw relevance score calculation is based, at least in part, on the following: (i) adjacency relations between nodes of the filtered linked data graph after edge filtering, (ii) the incoming and outgoing degrees of nodes in the filtered linked data graph after the edge filtering, and (iii) weight values of the edges of the filtered linked data graph;

receiving, by one or more processors, an identity of a set of complementary node(s) which are complementary to the start node;

calculating, by one or more processors, a set of complementary raw relevance score(s), the complementary raw relevance score(s) respectively corresponding to the relevance of the first target node to each complementary node of the set of complementary node(s), where the complementary relevance score calculation(s) are based, at least in part, on the following: (i) adjacency relations between nodes of the filtered linked data graph after edge filtering, (ii) the incoming and outgoing degrees of nodes in the filtered linked data graph after the edge filtering, and (iii) the weight values of the edges; and calculating, by one or more processors, a first refined relevance score, the first refined relevance score corresponding to the relevance of the first target node to the start node, where the first refined relevance score calculation determines the first refined relevance score by subtracting all complementary raw relevance score(s) from the first raw relevance score.

2. The method of claim 1 wherein the filtration of edges is based, at least in part, on Dijkstra's algorithm.

3. The method of claim 1 wherein the filtration of edges is based, at least in part, on Dijkstra's algorithm.

4. The method of claim 1 wherein the filtration of edges includes filtering any edge that is not on a shortest path between the start node and any other node of the linked data graph.

5. The method of claim 1 further comprising:
for each target node other than the first target node, calculating, by one or more processors, a respective raw relevance score, the respective raw relevance score corresponding to the relevance of the respective target node to the start node, where the respective raw relevance score calculation is based, at least in part, on the following: (i) adjacency relations between nodes after edge filtering, (ii) the incoming and outgoing degrees of nodes in the graph after the edge filtering, and (iii) the weight values of the edges.

6. The method of claim 5 further comprising:
ranking, by one or more processors, the target nodes based, at least in part, upon their relevance scores, where the relevance score for each target node is one of the following: its raw relevance score, or its refined relevance score.

7. The method of claim 5 wherein the set of target node(s) includes all nodes in the linked data graph other than the start node.

8. A computer program product for configuring data of a data storage system through filtering edges of a linked data graph which includes a plurality of nodes and a plurality of edges, the computer program product comprising:
one or more computer readable storage media and program instructions stored on the one or more computer readable storage media, the program instructions comprising:
program instructions to receive an identity of a start node from among the nodes of the linked data graph and an identity of a set of target node(s), including at least a first target node, from among the nodes of the linked data graph;
program instructions to configure data of the data storage system through filtering at least one edge from the plurality of edges of the linked data graph, wherein the edge filtering includes filtering, by removing, an edge that is not on a shortest path between the start node and a target node of the linked data graph;
program instructions to generate a filtered linked data graph corresponding to the filtering of the at least one edge from the plurality of edges of the linked data graph;
program instructions to calculate a first raw relevance score, the first raw relevance score corresponding to the relevance of the first target node to the start node, where the first raw relevance score calculation is based, at least in part, on the following: (i) adjacency relations between nodes of the filtered linked data graph after edge filtering, (ii) the incoming and outgoing degrees of nodes in the filtered linked data graph after the edge filtering, and (iii) weight values of the edges of the filtered linked data graph;
program instructions to receive an identity of a set of complementary node(s) which are complementary to the start node;
program instructions to calculate a set of complementary raw relevance score(s), the complementary raw relevance score(s) respectively corresponding to the relevance of the first target node to each complementary node of the set of complementary node(s), where the complementary relevance score calculation(s) are based, at least in part, on the following: (i) adjacency relations between nodes of the filtered linked data graph after edge filtering, (ii) the incoming and outgoing degrees of nodes in the filtered linked data graph after the edge filtering, and (iii) the weight values of the edges; and
program instructions to calculate a first refined relevance score, the first refined relevance score corresponding to the relevance of the first target node to the start node, where the first refined relevance score calculation determines the first refined relevance score by subtracting all complementary raw relevance score(s) from the first raw relevance score.

9. The product of claim 8 wherein the program instructions are further programmed to filter edges based, at least in part, on Dijkstra's algorithm.

10. The product of claim 8 wherein the program instructions are further programmed to filter edges based, at least in part, on Dijkstra's algorithm.

11. The product of claim 8 wherein the program instructions are further programmed to filter any edge that is not on a shortest path between the start node and any other node of the linked data graph.

12. The product of claim 8 wherein the computer readable storage media has further stored thereon:
program instructions to, for each target node other than the first target node, calculate a respective raw relevance score, the respective raw relevance score corresponding to the relevance of the respective target node to the start node, where the respective raw relevance score calculation is based, at least in part, on the following: (i) adjacency relations between nodes after edge filtering, (ii) the incoming and outgoing degrees of nodes in the graph after the edge filtering, and (iii) the weight values of the edges.

13. The product of claim 12 wherein the computer readable storage media further has stored thereon:
program instructions to rank the target nodes based, at least in part, upon their relevance scores, where the relevance score for each target node is one of the following: its raw relevance score, or its refined relevance score.

14. The product of claim 12 wherein the set of target node(s) includes all nodes in the linked data graph other than the start node.

15. A computer for configuring data of a data storage system through filtering edges of a linked data graph which includes a plurality of nodes and a plurality of edges, the computer system comprising:
one or more computer processors;
one or more computer readable storage media; and
program instructions stored on the computer readable storage media for execution by at least one of the one or more processors, the program instructions comprising:
program instructions to receive an identity of a start node from among the nodes of the linked data graph and an identity of a set of target node(s), including at least a first target node, from among the nodes of the linked data graph;
program instructions to configure data of the data storage system through filtering at least one edge from the plurality of edges of the linked data graph, wherein the edge filtering includes filtering, by removing, an edge that is not on a shortest path between the start node and a target node of the linked data graph;
program instructions to generate a filtered linked data graph corresponding to the filtering of the at least one edge from the plurality of edges of the linked data graph;
program instructions to calculate a first raw relevance score, the first raw relevance score corresponding to the relevance of the first target node to the start node, where the first raw relevance score calculation is based, at least in part, on the following: (i) adjacency relations between nodes of the filtered linked data graph after edge filtering, (ii) the incoming and outgoing degrees of nodes in the filtered linked data graph after the edge filtering, and (iii) the weight values of the edges;
program instructions to receive an identity of a set of complementary node(s) which are complementary to the start node;
program instructions to calculate a set of complementary raw relevance score(s), the complementary raw relevance score(s) respectively corresponding to the relevance of the first target node to each complementary node of the set of complementary node(s), where the complementary relevance score calculation(s) are based, at least in part, on the following: (i) adjacency relations between nodes of the filtered linked data graph after edge filtering, (ii) the incoming and outgoing degrees of nodes in the filtered linked data graph after the edge filtering, and (iii) the weight values of the edges; and
program instructions to calculate a first refined relevance score, the first refined relevance score corresponding to the relevance of the first target node to the start node, where the first refined relevance score calculation determines the first refined relevance score by subtracting all complementary raw relevance score(s) from the first raw relevance score.

16. The system of claim 15 wherein the program instructions are further programmed to filter edges based, at least in part, on Dijkstra's algorithm.

17. The system of claim 15 wherein the program instructions are further programmed to filter edges based, at least in part, on Dijkstra's algorithm.

* * * * *